United States Patent [19]
Monereau et al.

[11] Patent Number: 6,059,863
[45] Date of Patent: May 9, 2000

[54] PLANT FOR THE SEPARATION OF GASES BY ADSORPTION, AND USE FOR THE TREATMENT OF AIR FLOWS

[75] Inventors: Christian Monereau, Paris; Philippe Andreani, Le Kremlin Bicetre; Jean-Marc Belot, La Varenne Saint Hilaire; Jean-Baptiste Dellon, Paris, all of France

[73] Assignee: L'Air Liquide, Societe Anonyme pour l'Etude et l'Exploitation des Procedes Georges Claude, Paris Cedex, France

[21] Appl. No.: 09/140,689

[22] Filed: Aug. 26, 1998

[30] Foreign Application Priority Data

Aug. 26, 1997 [FR] France ................................. 97 10660

[51] Int. Cl.⁷ .................................................. B01D 53/04
[52] U.S. Cl. ................................ 96/152; 96/132; 96/144
[58] Field of Search ...................... 96/108, 121, 130–132, 96/143, 144, 152

[56] References Cited

U.S. PATENT DOCUMENTS

| | | | |
|---|---|---|---|
| 4,353,716 | 10/1982 | Rohde | 96/130 X |
| 4,374,095 | 2/1983 | Legg et al. | 422/218 |
| 4,698,072 | 10/1987 | Rohde et al. | 96/131 X |
| 5,232,479 | 8/1993 | Poteau et al. | 96/130 |
| 5,348,573 | 9/1994 | Tomassian et al. | 96/152 X |
| 5,441,559 | 8/1995 | Petit et al. | 96/130 X |
| 5,520,721 | 5/1996 | Fraysse et al. | 96/132 X |
| 5,593,475 | 1/1997 | Minh | 96/132 X |
| 5,716,427 | 2/1998 | Andreani et al. | 96/130 X |
| 5,814,129 | 9/1998 | Tentarelli | 96/152 X |
| 5,873,929 | 2/1999 | Andreani et al. | 96/152 X |
| 5,882,385 | 3/1999 | Bosquain et al. | 96/152 X |

FOREIGN PATENT DOCUMENTS

| | | |
|---|---|---|
| 0 118 349 | 9/1984 | European Pat. Off. . |
| 0 759 320 | 2/1997 | European Pat. Off. . |
| 0 778 082 | 6/1997 | European Pat. Off. . |
| 60-137431 | 7/1985 | France ..................................... 96/131 |
| 196 00 549 | 7/1997 | Germany . |

*Primary Examiner*—Robert H. Spitzer
*Attorney, Agent, or Firm*—Young & Thompson

[57] ABSTRACT

A plant for the separation of gases by adsorption, which is of the PSA type, includes, in a container (1) of vertical axis, at least one annular bed of particulate material (5, 6) supported on a lower wall (9) which is itself supported by a perforated prismatic wall (11) bearing on a domed end (2) of the container. A lower wall (9), advantageously in the form of a very wide inverted V (9A, 9B), has no part forming an angle ($\alpha$, $\beta$) in excess of 15° with the horizontal. The plant is useful in the separation of gases from air.

16 Claims, 1 Drawing Sheet

PLANT FOR THE SEPARATION OF GASES BY ADSORPTION, AND USE FOR THE TREATMENT OF AIR FLOWS

FIELD OF THE INVENTION

The present invention relates to plants for the separation of gases by adsorption, more particularly of the PSA or VSA type (pressure/vacuum swing adsorption), of the type comprising, in a container having a vertical general direction and a domed lower end including a central gas passage and a lateral gas passage, at least one annular volume, of vertical axis, of at least one particulate material delimited at the bottom by a lower wall, and at least a first prismatic wall provided with openings between the domed end and the lower wall.

BACKGROUND OF THE INVENTION

This type of separation plant, treating large gas flow rates with rapid cycle sequences, poses problems regarding circulation and distribution of the gases, which are further exacerbated in plants in which gas flows pass horizontally through the adsorbent, as is the case here. Furthermore, the annular bed is delimited by a lower wall which has to support the weight of the annular volume of particulate material, the forces resulting from the pressure differences on either side of this wall, in particular during the repressurization or depressurization steps in which head losses are created, as well as possibly the forces resulting from the packing means applied to the upper surface of the volume of particulate material.

A gas separation plant of this type is described in document EP-A-0,759,320 in the name of the Applicant Company. In this document, the lower wall, which is plane, has a considerable thickness in order to support the volumes of particulate materials, the space inside the latter as well as the space between the lower wall and the lower domed end of the container including perforated partitions for homogenizing the gas flows in these spaces.

After intensive research, the Applicant Company has observed that the shape of the lower walls of the adsorbent beds had substantial repercussions on proper distribution of the gas flows through the annular volume of particulate materials, and that it could in particular create deficiencies in distribution of gas flows, which are not limited to the adjacent zones but have a not insignificant effect actually within the volumes of particulate materials.

The Applicant Company has thus demonstrated that, in spite of the problems of mechanical strength which this poses, the end walls should not be domed and should be very slightly conical and not have any part forming an angle in excess of 15° with the horizontal. With shapes of this type, in order to achieve the requisite mechanical strength, it is possible, as in the aforementioned document, to provide a thick end wall bearing on the central feed duct. However, further to the problems of excess weight, the use of thick walls accentuates the radial heat transfer, and this modifies the temperature profile of the adjacent zones of the adsorbent beds, which therefore operate under different temperature conditions from those which are developed in the central adiabatic part of these beds, thus preventing optimum operation of the plant from being achieved. It is also envisagable to use radial stiffness under the lower wall, but studies carried out on architectures of this type show that this stiffness substantially modified the flow of the gases in the lower part of the container, creating preferential circulation channels towards the lateral gas passage.

SUMMARY OF THE INVENTION

The object of the present invention is therefore to provide novel arrangements of plant for the separation of gases by adsorption which, in an arrangement which is robust overall and has low manufacturing costs, make it possible to obtain optimum gas distribution with minimum energy consumption.

To this end, according to one aspect of the invention, the annular volume rests on a transverse lower wall of which no part forms an angle in excess of 15° with the horizontal and which is supported by the prismatic wall bearing on the domed end.

According to a particular characteristic of the invention, the lower wall is in the form of an inverted V and may rest on a second prismatic wall internally delimiting the internal space in the lower part of the container.

In an arrangement of this type, in contrast to the aforementioned document in which the lower annular perforated partition has the sole function of homogenizing the flow of the gases, the lower wall has a profile and a thickness which is optimized, the loads exerted on the latter being transferred to the robust and rigid lower domed part of the container, via a thick prismatic wall, which is also robust and rigid and here fulfils the twofold role of a support and a fluid distributor.

BRIEF DESCRIPTION OF THE DRAWINGS

Other characteristics and advantages of the present invention will emerge from the following description of embodiments, which are given by way of illustration but without implying any limitation and with reference to the appended drawings, in which.

DETAILED DESCRIPTION OF THE INVENTION

Figure 1:
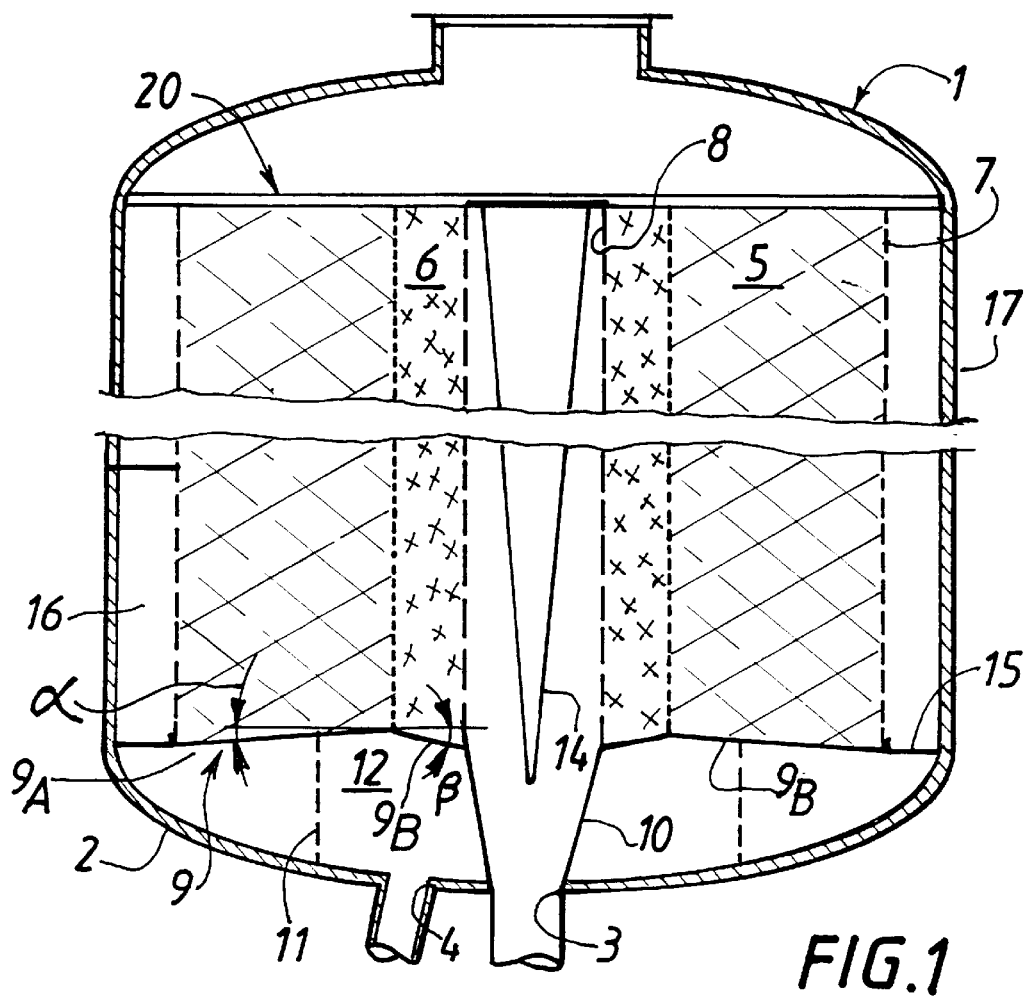
FIG. 1 is a partial schematic view in vertical section of a first embodiment of a gas separation plant according to the invention.

In the following description and in the drawings, the elements which are identical or similar have the same reference numbers, where appropriate indexed.

The figures show a PSA or VSA separation plant, typically for the treatment of air flows, in particular for the production of impure oxygen, comprising a container 1 whose geometry has a vertical axis of revolution when in the working configuration, with a lower domed end 2 including a central gas passage 3 and an offset or lateral gas passage 4. Arranged inside the container 1, there are an annular volume of adsorbent particles 5, typically a zeolite, and a juxtaposed coaxial central annular bed 6 of particulate material intended to retain water and carbon dioxide, typically alumina.

The main bed 5 is delimited peripherally by a grill 7 which is separated radially inwards from the peripheral shell of the container 1, whereas the central bed 6 is delimited internally by an internal grill or central distributor tube 8 whose lower end is secured to a lower wall 9 for supporting the adsorbent and to the upper end of a divergent distributor tube 10 whose lower end is secured to the central gas passage 3. The beds 5 and 6 are delimited at the top of the adsorber by retaining and packing means 20.

According to one aspect of the invention, the lower annular wall 9 of the adsorber support is relatively thin, with a thickness less than that of the domed end 2, typically less than half the latter, and in addition to bearing on the diffuser 10, is supported by a prismatic, advantageously cylindrical wall 11 whose thickness is greater than that of the wall 9, which is coaxial with the diffuser tube 10 and bears on the domed end 2 of the container 1. The wall 11 defines, with the tube 10, a lower internal space 12 into which the gas passage orifice 4 opens.

The prismatic wall 11 may be secured to the lower wall 9 and rest on the end 2. As a variant, the wall 9 may simply rest on the prismatic wall 11, the internals being centered, and supported if the adsorber is transported in a non-vertical position, by radial bracing elements extending between the peripheral shell 17 of the container 1 and the annular wall 9, as shown at 15 in FIG. 1, and/or between the shell and the grill 7, like the plate shown at 16 in FIG. 1.

The prismatic wall 11 is formed with a plurality of openings over its entire periphery and over its entire height, the aperture ratio (surface area of the openings as a ratio of the total theoretical surface area of the wall 11) being less than 60%, advantageously less than 30% and typically between 4 and 10%.

In the embodiment represented in FIG. 1, the lower wall 9 is, according to one aspect of the invention, formed as an inverted V of very wide aperture, with an outer frustoconical first part 9A descending outwards at an angle a with the horizontal and an inner frustoconical part 9B descending inwards at an angle β with the horizontal. According to one aspect of the invention, the angles α and β do not exceed 15° and are advantageously between 5° and 10°.

Figure 2:
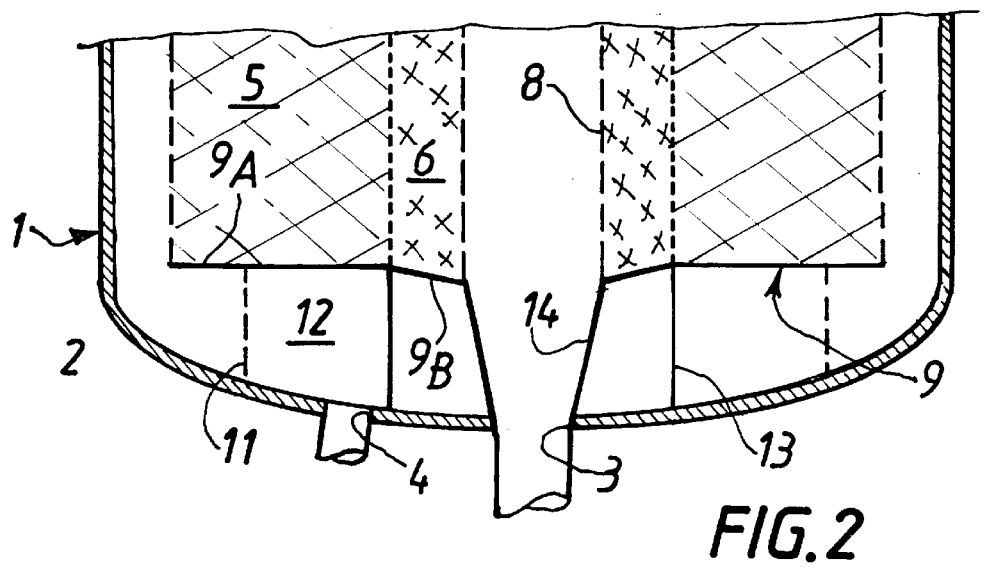
FIG. 2 is a partial view of the lower part of another, alternative embodiment of the invention.

As a variant, as represented in FIG. 2, the external portion 9A may be substantially plane, with the internal portion 9B keeping a downward conicity of more than 5°.

As can also be seen in this FIG. 2, according to one aspect of the invention, the support structure for the lower wall 9 may be split into a perforated prismatic wall 11, similar to the one described above, but offset towards the periphery of the portion 9A, and a central wall 13, coaxial with the former and possibly substantially free of openings, unless to promote ventilation.

In this embodiment, the internal space 12 into which the lateral gas passage 4 opens is that defined between the outer wall 11 and the inner wall 13.

In a particular embodiment, represented in FIG. 1, the central internal chamber inside the central grill or distributor tube 8 is centrally provided with a coaxial evolute profile section 14 promoting homogeneous distribution of the gas over the entire height of the annular beds 5 and 6 for passage through them.

The plants according to the invention principally find an application in the separation of gases from air, in particular for the production of enriched air or impure oxygen.

What is claimed is:

1. Plant for the separation of gases by adsorption, comprising:

a container having a domed lower end including a central gas passage and a lateral gas passage;

at least one annular volume, of vertical axis, of at least one particulate material delimited at the bottom by a transverse lower wall having a thickness less than that of the domed lower end; and at least a first prismatic wall provided with apertures between the domed end and the lower wall;

wherein the annular volume is supported on the transverse lower wall of which no part forms an angle in excess of 15° with the horizontal, and which is supported by the prismatic wall bearing on the domed end.

2. The plant according to claim 1, wherein the prismatic wall has an aperture ratio of less than 60%.

3. The plant according to claim 2, wherein the aperture ratio of the prismatic wall is less than 30%.

4. The plant according to claim 3, wherein the aperture ratio of the prismatic wall is between 4 and 10%.

5. The plant according to claim 1, wherein the lower wall is in the form of an inverted V.

6. The plant according to claim 1, wherein the lower wall rests on a second prismatic wall, delimiting, with the first prismatic wall, an annular internal space into which the lateral gas passage opens.

7. The plant according to claim 1, further comprising centering means arranged radially between the container and the annular volume.

8. The plant according to claim 1, further comprising a conical diffuser joining the central gas passage to an inner edge of the lower wall.

9. Plant for the separation of gases by adsorption, comprising:

a container having a domed lower end including a central gas passage and a lateral gas passage;

at least one annular volume, of vertical axis, of at least one particulate material delimited at the bottom by a transverse lower wall having the form of an inverted V; and at least a first prismatic wall provided with apertures between the domed end and the lower wall;

wherein the annular volume is supported on the transverse lower wall of which no part forms an angle in excess of 15° with the horizontal, and which is supported by the prismatic wall bearing on the domed end.

10. The plant according to claim 9, wherein the prismatic wall has an aperture ratio of less than 60%.

11. The plant according to claim 9, further comprising centering means arranged radially between the container and the annular volume.

12. The plant according to claim 9, further comprising a conical diffuser joining the central gas passage to an inner edge of the lower wall.

13. Plant for the separation of gases by adsorption, comprising:

a container having a domed lower end including a central gas passage and a lateral gas passage;

at least one annular volume, of vertical axis, of at least one particulate material delimited at the bottom by a transverse lower wall;

at least a first prismatic wall provided with apertures between the domed end and the lower wall;

said lower wall resting on a second prismatic wall, delimiting, with the first prismatic wall, an annular internal space into which the lateral gas passage opens; and wherein the annular volume is supported on the transverse lower wall of which no part forms an angle in excess of 15° with the horizontal, and which is supported by the first prismatic wall bearing on the domed end.

14. The plant according to claim 13, wherein the first prismatic wall has an aperture ratio of less than 60%.

15. The plant according to claim 13, further comprising centering means arranged radially between the container and the annular volume.

16. The plant according to claim 13, further comprising a conical diffuser joining the central gas passage to an inner edge of the lower wall.

* * * * *